Patented July 25, 1944

2,354,359

UNITED STATES PATENT OFFICE 2,354,359

PROCESS OF IMPROVING HYDROCARBON MIXTURES

Leland James Beckham, Geddes, N. Y., assignor to The Solvay Process Company, New York, N. Y., a corporation of New York No Drawing. Application December 4, 1941, Serial No. 421,551

8 Claims. (Cl. 260—513)

This invention relates to a process for removing undesirable constituents from petroleum hydrocarbons and related hydrocarbon mixtures comprising olefines. It relates particularly to a process of treating petroleum hydrocarbons and related hydrocarbon mixtures derived from mineral sources comprising olefines, such as petroleum hydrocarbons obtained by cracking, dehydrogenating, or oxidizing petroleum fractions, and synthetic hydrocarbon mixtures obtained from hydrogenated carbon oxides, whereby upon using the treated petroleum hydrocarbons or related mixtures in a process in which the olefines contained therein are reacted with nitrosyl chloride to form addition products therewith, and the addition products are treated to replace the chlorine therein with a radical comprising a water-solubilizing group, such as a sulfonate group, valuable compounds are obtained possessing improved color characteristics. This application is a continuation-in-part of my copending application Serial No. 221,707, filed July 28, 1938, now U. S. P. 2,265,993.

Processes are known for the preparation of derivatives of the olefines in hydrocarbon mixtures derived from mineral sources such as are prepared by cracking or dehydrogenating petroleum fractions or by catalytically hydrogenating carbon oxides or coal. These products are made up of ordinary olefines, other olefines, such as diolefines, and other hydrocarbons. It has been proposed to employ these products as starting materials for the production of various types of compounds. For example, it has been proposed to sulfonate them directly so as to convert olefines therein into mixed sulfonation derivatives which may be used as wetting and emulsifying agents, and as detergents.

In my afore-mentioned copending application Serial No. 221,707, filed July 28, 1938, I have described a process for the production of valuable mixed products in which the starting materials may be and preferably are petroleum hydrocarbons comprising olefines. This process involves reacting the petroleum hydrocarbons with nitrosyl chloride to form an addition product of olefines and the nitrosyl chloride. This addition product is a complex mixture of compounds substantially all of which contain chlorine. The addition product is then treated so as to replace the chlorine by a radical comprising a water-solubilizing group. This step is preferably carried out by reacting the addition product with an alkali metal sulfite such as sodium sulfite so as to replace the chlorine with a sulfonate group.

Depending upon the number of carbon atoms in the olefines present in the petroleum hydrocarbons employed, the compounds prepared by this process have varying properties. The sulfonates prepared from hydrocarbons comprising olefines having 10 to 30 carbon atoms have surface active properties which make them useful as detergents and wetting, dispersing, emulsifying, and the like agents, and the sulfonates prepared from hydrocarbons comprising olefines having 5 to 12 carbon atoms are also useful as intermediates for the production of other products; such as alcohols, acids, etc.

The addition products referred to above are products formed between a hydrocarbon containing at least one aliphatic

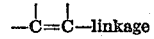

—C=C—linkage and nitrosyl chloride. The process is carried out so as to convert such hydrocarbons to nitroso chlorides; i. e., compounds in which a nitroso group and a chlorine atom are attached to adjacent carbon atoms which formed an unsaturated linkage in the hydrocarbon. The formation of nitroso chlorides is indicated by the appearance of the blue or green color characteristic of these compounds. The addition products are believed to contain initially also a proportion of dichlorides. It appears that the addition product as first formed is unstable and that the greater proportion at least of the nitroso chlorides contained therein are converted upon standing to polymeric or isomeric forms, such as dimers of undetermined structure and chloroximes. In speaking of addition products in the specification and claims, it will be understood that it is intended to refer to the products before and after conversion of the nitroso chlorides to polymeric or isomeric forms.

In manufacturing chemical compounds from relatively crude mixtures such as the hydrocarbon mixtures of the type in question, one of the problems which ordinarily arises is that of color. A highly colored product meets sales resistance because of its appearance. It is particularly important to prepare a product of good color where the product is to be offered for sale for domestic use. Another problem which arises is due to the fact that such petroleum hydrocarbons contain gum-forming constituents. Thus, when using the petroleum hydrocarbons of the type herein referred to as starting materials in various processes, the deposition of gum retards operation of the processes, and often prevents the efficient production of good products. While this has not been conclusively established, it seems that at least some of the color-forming constituents of the petroleum hydrocarbons also tend to form gums.

It is an object of the present invention to provide a process for removing certain constituents from olefine-containing hydrocarbon mixtures derived from mineral sources whereby the hydrocarbon mixtures are changed so that upon being used in the production of derivatives of the olefines, especially mixed products of the class disclosed in my earlier application, products of improved properties, particularly with respect to color, are obtained. Another object of the invention is to provide a process for removing gum-forming constituents from petroleum hydrocarbon mixtures comprising olefines. In this connection, it is pointed out that the term "olefine" is used herein in its broad sense and includes unsaturated hydrocarbons containing one, or more than one, aliphatic

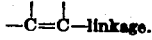

Other objects of the invention will in part be obvious and will in part appear hereinafter.

It has been discovered in accordance with the present invention that the color-forming constituents present in olefine-containing hydrocarbon mixtures derived from mineral sources are more reactive with nitrosyl chloride than the other hydrocarbons present in such compositions. It has also been discovered that the constituents which tend to form gums during later processing also are more reactive with nitrosyl chloride than the more valuable hydrocarbon constituents of said mixtures. Researches leading to the development of the present invention have indicated that many of the undesirable constituents of cracked or dehydrogenated petroleum fractions, for example, are of an olefinic nature, although they necessarily must differ in structural respects from the olefines which make up the useful portion of the petroleum fractions.

Thus it has been found that by reacting a cracked or dehydrogenated petroleum fraction, or a fraction prepared by a combination of dehydrogenation and cracking, with considerably less nitrosyl chloride than is required for reaction with all of the unsaturated compounds contained therein, under conditions adapted to form addition products between nitrosyl chloride and olefines in the petroleum fraction, and removing the resulting reaction products from the resulting mixture, the petroleum hydrocarbons are placed in such condition that upon subsequent processing they are converted efficiently to compounds having particularly valuable properties, especially with respect to color.

In carrying out the present process in accordance with a preferred manner of proceeding, a hydrocarbon mixture of the type herein described, for example, a dehydrogenated and/or cracked petroleum fraction is reacted with nitrosyl chloride in limited amount under conditions adapted to form addition products between nitrosyl chloride and olefines in the hydrocarbon mixture. The nitrosyl chloride can be introduced into the hydrocarbon mixture as a gas or a liquid and the reaction can be carried out at temperatures and pressures varying over wide limits. For example, temperatures varying from —20° to 80° C. and partial pressures of nitrosyl chloride varying from 0.02 to 2 atmospheres absolute have been found to be suitable. Since ordinary atmospheric temperatures and pressures are satisfactory the reaction is conveniently carried out under these conditions. Although the amount of nitrosyl chloride required to accomplish the objects of the invention will vary depending upon the particular hydrocarbon mixtures subjected to treatment, it has been found in general that it is unnecessary to use more than 0.2 mol of nitrosyl chloride for each mol of olefine in the hydrocarbon mixture and in most cases it is preferred to employ the nitrosyl chloride in an amount such that 0.1 mol of nitrosyl chloride is used for each mol of olefine.

After the reaction with the nitrosyl chloride has been completed there is obtained a mixture composed of reaction products (many of which are addition products of the type referred to above), the desired olefines, and other hydrocarbons normally present in said hydrocarbon mixtures, such as paraffins and cycloparaffins. Ordinarily, at least a portion of the reaction products are in the form of a gum. Where it is desired merely to effect removal of a portion of the gum-forming constituents from the other hydrocarbons, this gum may be separated from the remainder of the mixture by decantation or by equivalent procedure. However, where it is desired to effect a greater purification of the said hydrocarbons and, as is usually the case, the reaction products resulting from the nitrosyl chloride treatment (in many cases including the gum) are largely chlorine-containing addition products of the type above referred to, the reaction products are separated from the reacted mixture by first converting them into a form possessing increased solubility in water and then removing the solubilized products in the form of an aqueous solution. This is conveniently accomplished by replacing the chlorine, present in the reaction products as a result of the treatment with nitrosyl chloride, with a radical comprising (i. e., consisting of or containing) a water-solubilizing group; it is preferably accomplished by treating the reacted mixture with an alkali metal (including ammonium) sulfite, especially sodium sulfite, under reaction conditions adapted to replace the chlorine with a sulfonate group. The sulfite is preferably added to the mixture resulting from the nitrosyl chloride treatment in the form of an aqueous solution which preferably also contains a mutual solvent, such as an alcohol, to improve the degree of contact between reacting ingredients. The mixture formed in this way is then maintained at a temperature adapted to cause replacement of the chlorine, preferably between 60° and 130° C. To maintain intimate contact between the reacting ingredients during this step, the mixture is subjected to agitation. At the end of the reaction with the sulfite, the resulting product consists of a water-soluble portion and a water-insoluble portion. The product is then cooled if necessary and the water-soluble and water-insoluble portions are separated.

If desired the gum may be separated first from the remainder of the mixture, by decantation or by equivalent procedure, and the remaining reaction products contained in the mixture may then be converted to a water-soluble form by replacing the chlorine contained therein with a radical comprising a water-solubilizing group, e. g., in the manner above described. Or, if the gum-forming constituents do not constitute an important portion of the undesired constituents of the hydrocarbon mixture but other impurities, such as color-forming constituents, constitute the major undesired impurities, the gum may be separated from the remainder of the mixture resulting from the reaction with the nitrosyl chloride, by decantation or by equivalent procedure; the remaining reaction products may then be subjected to conversion to a water-soluble form in the manner above described, and the water-insoluble portion may be mixed with the previously separated gum prior to further treatment in the manner described below.

The water-insoluble portion consists of hydrocarbons comprising olefines excellently adapted for further treatment. It is preferably employed in the manufacture of mixed sulfonates by the process disclosed in my application Serial No. 221,707 involving treating it with nitrosyl chloride in proportions such that substantially all of the olefines contained therein are converted to addition products. To accomplish this purpose it is preferred to use about 2.5 to 4 mols of the nitrosyl chloride for each mol of olefine. The chlorine contained in the addition product is then replaced with a sulfonate radical, to obtain the desired mixture of sulfonates. Such sulfonates prepared from petroleum hydrocarbons pretreated in accordance with the present invention are superior with respect to color to sulfonates prepared from identical petroleum hydrocarbons which have not been pretreated. Also the pretreatment procedure of the present invention simplifies the carrying out of the process for the manufacture of the mixed sulfonates since at least a portion of the gum-forming constituents of the petroleum hydrocarbons has been removed.

In order that the invention may be understood more fully the following examples are given. It will be understood that these examples are given for illustrative purposes merely and are not intended to be limitations of the invention.

Example 1

*Part 1.*—A petroleum hydrocarbon mixture, which was prepared by cracking a Bunker C fuel oil and which boiled over the range from 200° to 225° C. at 50 mm. pressure, was treated in accordance with the process of the invention. Thus, over a period of one-half hour nitrosyl chloride was introduced into the petroleum hydrocarbon mixture at a rate such that 0.1 mol of nitrosyl chloride was used for each mol of olefine in the mixture. During the introduction of the nitrosyl chloride, the temperature of the mixture was about 25° C. The excess nitrosyl chloride was then removed by blowing with dry hair. To the resulting mixture, which contained reaction products, olefines, and other hydrocarbons, a solution containing three mols of sodium sulfite, one mol of sodium bisulfite, three mols of isopropyl alcohol, and 70 mols of water was added for each atom of nitrogen introduced by the pretreatment. The reaction mixture formed in this way was heated gradually to 86° C. and was maintained at this temperature for 24 hours while stirring. The mixture was then permitted to stand and two layers, a lower aqueous layer and an upper oil layer, formed. The upper oil layer was separated, washed with water, and dried.

*Part 2.*—This dried oil layer contained in a closed vessel was then reacted with nitrosyl chloride in an amount corresponding to two and one-half mols nitrosyl chloride for each mol of olefine. The nitrosyl chloride was introduced as a vapor under the surface of the liquid. As a result of this treatment substantially all of the olefines in the petroleum hydrocarbons were converted to addition products which contained replaceable chlorine. The excess nitrosyl chloride was removed by blowing with dry air and a small amount of gum formed by the action of the nitrosyl chloride was removed. The resulting product was introduced into a solution containing 3 mols of sodium sulfite, 1 mol of sodium bisulfite, 3 mols of isopropyl alcohol, and 70 mols of water for each mol of initial olefine. After the addition was completed the mixture was heated over a one-hour period to the boiling point (about 85° C.). Moderate agitation was provided and the reaction was continued at this temperature for about 12 hours. At the end of the sulfite treatment the aqueous and oil phases which formed were separated hot. To remove traces of oil the aqueous phase was extracted with a mixture of ispropyl alcohol and petroleum naphtha. The purified aqueous solution was heated to evaporate residual alcohol and petroleum naptha. The resulting concentrated aqueous solution was then dried, by means of a drum drier, to yield a dry product which is referred to below as sample A.

*Part 3.*—Another portion of the petroleum hydrocarbon mixture employed in Part 1 of this example was converted into a sulfonated product in the manner described in Part 2 of this example (i. e., the same process as that employed for making sample A, except for the pretreatment described in Part 1). The dry product obtained had about 70 per cent more color than sample A, and furthermore possessed less cleansing power.

Example 2

In this example a petroleum hydrocarbon mixture prepared by cracking a Pennsylvania oil was employed. The hydrocarbon mixture boiled at about 200° C. at pressures decreasing from 50 to 23 mm. of mercury and contained about 16 per cent olefine. From two portions of this hydrocarbon mixture samples identified as sample No. 1 and sample No. 2 were prepared by a procedure similar to that described in Example 1, Part 2, with the exception that the portion of the hydrocarbon mixture used in preparing sample No. 1 was pretreated in the following manner: 200 parts by weight of the petroleum hydrocarbon mixture were treated at 27° C. with a gaseous mixture of 12 parts of nitrogen and 1.4 parts of nitrosyl chloride. This treatment was accomplished by passing the gaseous mixture into the hydrocarbon mixture over a one-half hour period. Excess nitrosyl chloride was removed by passing nitrogen through the mixture. Then 83 parts of sodium sulfite, 55 parts of methyl alcohol, and 208 parts of water were added to the mixture, and the heterogeneous product thus formed was heated with stirring at 85° C. for four hours. At the end of this time the mixture was permitted to stand and separate into an oil layer and an aqueous layer. The oil layer was recovered, washed with water, and dried over magnesium sulfate. Sample No. 1 was superior to sample No. 2 in that sample No. 2 had 60 per cent more color than sample No. 1.

Example 3

A cracked petroleum hydrocarbon mixture which boiled over the range from 125° to 175° C. at atmospheric pressure was subjected to the treatment described in above Example 1, Parts 1 and 2. The resulting product is referred to as sample C. Another portion of the same petroleum hydrocarbon mixture was subjected to the treatment described in above Example 1, Part 2, and the resulting product is referred to as sample D. Still another portion of the same petroleum hydrocarbon mixture was subjected to a treatment similar to that described in above Example 1, Parts 1 and 2, with the exception that the gum formed as a result of the pretreatment in Part 1 was separated from the remainder of the mixture resulting from the pretreatment by decantation prior to the addition of the sulfite solution, and the resulting product is referred to as sample E. Sample D was considerably more colored than sample C. Sample E was superior to both samples C and D.

It will be apparent to those skilled in the art that changes may be made in the processes described above without departing from the invention.

Thus the present process for the improvement in hydrocarbon mixtures comprising olefines may be employed with advantage for the treatment of other hydrocarbon mixtures derived from mineral sources and comprising olefines; for example petroleum hydrocarbons (e. g., paraffin oils or waxes), partially converted to olefines by cracking in the liquid or vapor phase, dehydrogenation, chlorination followed by dehydrochlorination, and/or partial oxidation; other hydrocarbon mixtures of a similar nature derived by the catalytic hydrogenation of carbon oxides or coal which are primarily of aliphatic character and contain olefines or are partially converted to olefines by one or more of the procedures mentioned herein. The process is especially valuable for the treatment of hydrocarbon mixtures comprising olefines containing 5 to 30 carbon atoms and derived from mineral sources.

For removing the reaction products formed between the undesirable constituents of the petroleum hydrocarbons and the nitrosyl chloride it is preferred to employ a procedure involving the use of an alkali metal (including ammonium) sulfite to replace the chlorine in the reaction products with a sulfonate group. However, the invention also includes processes involving replacing the chlorine in the reaction products with other radicals comprising water-solubilizing groups. The processes contemplated include processes in which the treatment of a reaction product between the undesirable constituents of petroleum hydrocarbons comprising olefines and nitrosyl chloride, to replace the chlorine with a radical comprising a water-solubilizing group, is carried out in one or more stages; the first stage of the treatment, which may be the only stage, involving reacting the reaction product with a compound containing a reactive cation (i. e., a cation which is capable of reacting with the chlorine contained in the reaction product to form a compound with the chlorine) whereby the reactive cation combines with the chlorine of the reaction product, and a residue of the compound, which may be a radical comprising a water-solubilizing group or a radical comprising a group capable of being converted to a water-solubilizing group upon further treatment, replaces the chlorine of the reaction product. For example, the invention includes processes wherein a reaction product is reacted with other water-soluble salts of oxygen-containing polybasic inorganic acids which are capable of reacting therewith to replace the chlorine atom with a residue of the acid. As examples of such salts, which are conveniently termed "reactive" salts, there may be mentioned the alkali metal thiosulfates.

Since certain changes may be made in carrying out the above-described process without departing from the scope of the invention, it is intended that all matter contained in the above description should be interpreted as illustrative and not in a limiting sense.

I claim:

1. In the process for preparing products having surface active properties comprising reacting nitrosyl chloride with a mixture of petroleum hydrocarbons comprising olefines to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the petroleum hydrocarbons comprising olefines, to remove undesirable constituents of the petroleum hydrocarbons, by reacting said petroleum hydrocarbons with nitrosyl chloride under conditions adapted to form addition products between nitrosyl chloride and olefines in said petroleum hydrocarbons, the amount of nitrosyl chloride employed being not more than the amount corresponding to 0.2 mol of the nitrosyl chloride for each mol of olefine in the petroleum hydrocarbons, whereby unreacted olefines are left in substantial amount in said petroleum hydrocarbons, removing resulting reaction products containing chlorine from said petroleum hydrocarbons by reacting said reaction products with an alkali metal sulfite to replace the chlorine with a sulfonate radical, thereby converting the reaction products to water-soluble sulfonates, and separating the water-soluble sulfonates from said olefine-containing petroleum hydrocarbons.

2. In the process for preparing products having surface active properties comprising reacting nitrosyl chloride with a mixture of petroleum hydrocarbons comprising olefines to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the petroleum hydrocarbons comprising olefines, to remove undesirable constituents of the petroleum hydrocarbons, by reacting said petroleum hydrocarbons with nitrosyl chloride under conditions adapted to form addition products between nitrosyl chloride and olefines in said petroleum hydrocarbons, the amount of nitrosyl chloride employed being not more than the amount corresponding to 0.2 mol of the nitrosyl chloride for each mol of olefine in the petroleum hydrocarbons, whereby unreacted olefines are left in substantial amount in said petroleum hydrocarbons, heating a resulting mixture of petroleum hydrocarbons and reaction products containing chlorine with an aqueous solution of an alkali metal sulfite to replace chlorine in said reaction products with a sulfonate radical, whereby there is formed a reaction mixture comprising an oil phase and an aqueous phase containing sulfonates, and recovering the oil phase consisting of said petroleum hydrocarbons from which undesirable constituents have been removed.

3. In the process for preparing products having surface active properties comprising reacting nitrosyl chloride with a mixture of petroleum hydrocarbons comprising olefines to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the petroleum hydrocarbons comprising olefines, to remove undesirable constituents of the petroleum hydrocarbons, by reacting said petroleum hydrocarbons with nitrosyl chloride under conditions adapted to form addition products between nitrosyl chloride and olefines in said petroleum hydrocarbons, the amount of nitrosyl chloride employed being not more than the amount corresponding to 0.2 mol of the nitrosyl chloride for each mol of olefine in the petroleum hydrocarbons, whereby unreacted olefines are left in substantial amount in said petroleum hydrocarbons, separating gum formed by the reaction from the remaining mixture of petroleum hydrocarbons and reaction products containing chlorine, heating said remaining mixture with an aqueous solution of an alkali metal sulfite to replace chlorine in said reaction products with a sulfonate radical, whereby there is formed a reaction mixture comprising an oil phase and an aqueous phase containing sulfonates, and recovering the oil phase consisting of said petroleum hydrocarbons from which undesirable constituents have been removed.

4. In the process for preparing products having surface active properties comprising reacting nitrosyl chloride with a mixture of petroleum hydrocarbons comprising olefines containing 5 to 30 carbon atoms and selected from the group of petroleum products consisting of cracked petroleum products, dehydrogenated petroleum products, dehydrohalogenated-halogenated petroleum products and partially-oxidized petroleum products, to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the petroleum hydrocarbons comprising olefines, to remove undesirable constituents of the petroleum hydrocarbons, by reacting said petroleum hydrocarbons with nitrosyl chloride under conditions adapted to form addition products between nitrosyl chloride and olefines in said petroleum hydrocarbons, the amount of nitrosyl chloride employed being not more than the amount corresponding to 0.2 mol of the nitrosyl chloride for each mol of olefine in the petroleum hydrocarbons, whereby unreacted olefines are left in substantial amount in said petroleum hydrocarbons, heating the resulting mixture of petroleum hydrocarbons and reaction products containing chlorine with an aqueous solution of sodium sulfite to replace chlorine in said reaction products with a sulfonate radical, whereby there is formed a reaction mixture comprising an oil phase and an aqueous phase containing sulfonates, and recovering the oil phase consisting of said petroleum hydrocarbons from which undesirable constituents have been removed.

5. In the process for preparing products having surface active properties comprising reacting nitrosyl chloride with a mixture of petroleum hydrocarbons comprising olefines containing 10 to 30 carbon atoms and selected from the group of petroleum products consisting of cracked petroleum products, dehydrogenated petroleum products, dehydrohalogenated-halogenated petroleum products and partially-oxidized petroleum products, to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the petroleum hydrocarbons comprising olefines, to remove undesirable constituents of the petroleum hydrocarbons, by reacting said petroleum hydrocarbons with nitrosyl chloride under conditions adapted to form addition products between nitrosyl chloride and olefines in said petroleum hydrocarbons, the amount of nitrosyl chloride employed being not more than the amount corresponding to 0.2 mol of the nitrosyl chloride for each mol of olefine in the petroleum hydrocarbons, heating the resulting mixture of petroleum hydrocarbons and reaction products containing chlorine with an aqueous solution of sodium sulfite to replace chlorine in said reaction products with a sulfonate radical, whereby there is formed a reaction mixture comprising an oil phase and an aqueous phase containing sulfonates, and recovering the oil phase consisting of said petroleum hydrocarbons from which undesirable constituents have been removed.

6. In the process of preparing products having surface active properties comprising reacting nitrosyl chloride with a mixture of hydrocarbons comprising olefines containing 5 to 30 carbon atoms and derived from hydrogenated carbon oxides to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the mixture of hydrocarbons comprising olefines, to remove undesirable constituents of the hydrocarbon mixture, by reacting said mixture of hydrocarbons with nitrosyl chloride under conditions adapted to form addition products between nitrosyl chloride and olefines in said mixture of hydrocarbons, the amount of nitrosyl chloride employed being not more than the amount corresponding to 0.2 mol of the nitrosyl chloride for each mol of olefine in the mixture of hydrocarbons, heating the resulting mixture of hydrocarbons and reaction products containing chlorine with an aqueous solution of sodium sulfite to replace chlorine in said reaction products with a sulfonate radical, whereby there is formed a reaction mixture comprising an oil phase and an aqueous phase containing sulfonates, and recovering the oil phase consisting of said mixture of hydrocarbons from which undesirable constituents have been removed.

7. In the process of preparing products having surface active properties comprising reacting nitrosyl chloride with a mixture of hydrocarbons comprising olefines containing 10 to 30 carbon atoms and resulting from the hydrogenation of carbon oxides, to convert the mixture to a composition comprising hydrocarbons and addition products of olefines and nitrosyl chloride, and reacting the addition products with an alkali metal sulfite to replace chlorine therein with a sulfonate group, the improvement which comprises pretreating the mixture of hydrocarbons comprising olefines, to remove undesirable constituents of the hydrocarbon mixture, by reacting said mixture of hydrocarbons with nitrosyl chloride under conditions adapted to form addition products between nitrosyl chloride and olefines in said mixture of hydrocarbons, the amount of nitrosyl chloride employed being not more than the amount corresponding to 0.2 mol of the nitrosyl chloride for each mol of olefine in the mixture of hydrocarbons, heating the resulting mixture of hydrocarbons and reaction products containing chlorine with an aqueous solution of sodium sulfite to replace chlorine in said reaction products with a sulfonate radical, whereby there is formed a reaction mixture comprising an oil phase and an aqueous phase containing sulfonates, and recovering the oil phase consisting of said mixture of hydrocarbons from which undesirable constituents have been removed.

8. In the process for preparing products having surface-active properties comprising reacting nitrosyl chloride with a hydrocarbon mixture derived from a mineral source and comprising olefines, to convert the mixture to a composition comprising hydrocarbons and addition products of olefines and nitrosyl chloride, and reacting the addition products with an alkali metal sulfite to replace chlorine in said addition products with a sulfonate group, the improvement which comprises pretreating said hydrocarbon mixture to remove undesirable constituents thereof, by reacting said hydrocarbon mixture with nitrosyl chloride under conditions adapted to form addition products between nitrosyl chloride and olefines in said mixture, the amount of nitrosyl chloride employed being substantially less than the amount required for reaction with all of the olefines in said mixture, whereby unreacted olefines are left in substantial amount in said hydrocarbon mixture, and recovering the resulting olefine-containing hydrocarbon mixture free from resulting reaction products containing chlorine by reacting said reaction products with a compound selected from the group consisting of alkali metal sulfites and alkali metal thiosulfates, thereby converting the reaction products to water-soluble compounds, and separating the water-soluble compounds from the olefine-containing hydrocarbon mixture.

LELAND JAMES BECKHAM.